United States Patent [19]
Yamashita et al.

[11] Patent Number: 5,366,655
[45] Date of Patent: Nov. 22, 1994

[54] STABLE SODIUM PERCARBONATE PARTICLE AND PROCESS FOR PREPARING SAME

[75] Inventors: Hiroyuki Yamashita; Kouichi Hatano, both of Wakayama; Mutsumi Kuroda, Tochigi, all of Japan

[73] Assignee: Kao Corporation, Tokyo, Japan

[21] Appl. No.: 791,060

[22] Filed: Nov. 12, 1991

[30] Foreign Application Priority Data

Nov. 21, 1990 [JP] Japan .................................. 2-320057

[51] Int. Cl.⁵ .................. C01B 15/04; C01B 15/10; C01B 31/00
[52] U.S. Cl. ................... 252/186.27; 252/186.25; 423/415.2
[58] Field of Search .................... 252/186.27, 186.30; 423/415.2

[56] References Cited

U.S. PATENT DOCUMENTS 4,526,698  7/1985  Kuroda et al. .................. 423/415.2

FOREIGN PATENT DOCUMENTS 2528447  12/1983  France .
8204806   5/1982  Japan .................................. 423/415.2
0118606  11/1983  Japan .................................. 423/415.2

OTHER PUBLICATIONS

European Search Report.

*Primary Examiner*—Robert L. Stoll
*Assistant Examiner*—Joseph D. Anthony
*Attorney, Agent, or Firm*—Birch, Stewart, Kolasch & Birch

[57] ABSTRACT

A stable sodium percarbonate particle that at least the inside of the particle is penetrated and coated with a borate and a process for preparing the same are disclosed.

The sodium percarbonate particle of the invention is preparesd by subjecting a dried sodium percarbonate particle and an aqueous solution of a borate to solid-liquid mixing and then drying the mixture.

9 Claims, 1 Drawing Sheet

FIG. 1

STABLE SODIUM PERCARBONATE PARTICLE AND PROCESS FOR PREPARING SAME

BACKGROUND OF THE INVENTION

1. Field of Industrial Application

This invention relates to a sodium percarbonate particle having excellent stability and also to a process for preparing the same.

2. Description of Related Art

Sodium percarbonate is well-known as a bleaching or oxidizing agent. It is commonly manufactured by the reaction of sodium carbonate with hydrogen peroxide. As its general formula $2Na_2CO_3.3H_2O_2$ implies, it comprises an addition compound of sodium carbonate with hydrogen peroxide. Although sodium percarbonate is somewhat inferior in bleaching power at ordinary temperature to chlorinated bleaches, it can be used in bleaching textile pieces with colored patterns, does not damage the fabric, and causes no yellowing. These and other advantages have allowed it to enjoy widespread use, alone or in admixture with detergents, as oxygenated bleaching agents for household or business use.

The reason why an interest is attached to the use of sodium percarbonate in applications such as general detergents and domestic bleaches is that its decomposition products are not pollutants and can be used in whatever way desired without any problem.

However, sodium percarbonate has a serious drawback in that it is rather poor in storage stability as compared with sodium perborate and fairly rapidly loses its available oxygen during storage. Since sodium percarbonate has a very high affinity towards water, it becomes wetted on its surface even with a small amount of moisture and begins decomposing. Iron, copper, manganese, cobalt, and other such ions, if present in the system, accelerate its decomposition, making it less stable than sodium perborate. When sodium percarbonate, alone, is stored in a closed vessel, it proves to be as stable during storage as sodium perborate. When blended with a detergent or left in an open vessel, however, it exhibits inadequate storage stability because of its high hygroscopicity, despite its good solubility.

It is therefore desired to provide a sodium percarbonate which does not decompose rapidly upon standing in an open vessel and, when blended with whatever detergent or bleach composition, does not present any storage stability problems, Many different researches have been conducted with regard to the stabilization of sodium percarbonate and various approaches have been proposed. Particularly, a large number of proposals have been made with respect to coating the surface of a sodium percarbonate particle with an inorganic matter.

For instance, Japanese Patent Publication No. 31839/1972 discloses sodium percarbonate surface-coated with sodium perpyrophosphate; U.S. Pat. No. 3,977,988, sodium percarbonate surface-coated with a silicate-silicofluoride mixture; Japanese Patent Publication No. 5875/1978, sodium percarbonate surface-coated with a silicate-glycine mixture; U.S. Pat. No. 4,105,827, sodium percarbonate surface-coated with a crystallized mixed salt consisting of sodium carbonate and either sodium bicarbonate or sodium sulfate; U.S. Pat. No. 4,194,025, sodium percarbonate surface-coated with dehydrated sodium perborate and sodium silicate; U.S. Pat. No. 4,325,933, sodium percarbonate surface-coated with an alkaline earth metal salt; U.S. Pat. No. 4,156,039, sodium percarbonate surface-coated with dehydrated sodium perborate; Japanese Patent Laid-Open No. 193999/1984, sodium percarbonate surface-coated with a borate-silicate mixture; Japanese Patent Laid-Open No. 194000/1984, sodium percarbonate surface-coated with a borate-magnesium compound mixture: Japanese Patent Laid-Open No. 118606/1985, sodium percarbonate surface-coated with a mixture of boric acid or borate and a water repellent agent; and U.S. Pat. No. 4,526,698, sodium percarbonate surface-coated with a borate. These sodium percarbonates coated with inorganic salts are fairly improved in stability but not to a satisfactory extent.

SUMMARY OF THE INVENTION

The present inventors have made investigations in particular on the stabilization of sodium percarbonate particles. It was presumed in the course of research that, while a sodium percarbonate particle has numerous pores within the particle, the inorganic salt-coated sodium percarbonate particle of the prior art is one coated only on its surface, the coating being so imperfect as to leave minute interstices on the surface so that the particle absorbs moisture through these interstices and disintegrates from the inside thereof. However, absolutely perfect coating of the particle surface with an inorganic salt is next to impossible and, if ever possible, would require a very large amount of the inorganic salt. After further intensive research under the circumstances, the present inventors have found that a sodium percarbonate particle prepared by penetrating and coating a borate to its pores attain exceptionally good stability and have accomplished the present invention on that basis.

Accordingly the present invention provides for a stable sodium percarbonate particle which comprises a sodium percarbonate particle and a borate wherein at least the inside of said particle is penetrated and coated with said borate.

The present invention also provides for a stable sodium percarbonate particle which comprises a sodium percarbonate particle and a borate wherein the inside of said particle is penetrated and coated with said borate and the surface of said particle is coated with said borate.

Furtheremore the present invention provides for a process for preparing a stable sodium percarbonate particle which comprises (a) subjecting a dried sodium percarbonate particle and an aqueous solution of a borate to solid-liquid mixing to form a mixture wherein the temperature of said dried sodium percarbonate particle is 50° C. and below during the solid-liquid mixing step, and (b) drying said mixture.

DETAILED DESCRIPTION OF THE INVENTION

Detailed Description of the Preferred Embodiment

Figure 2:
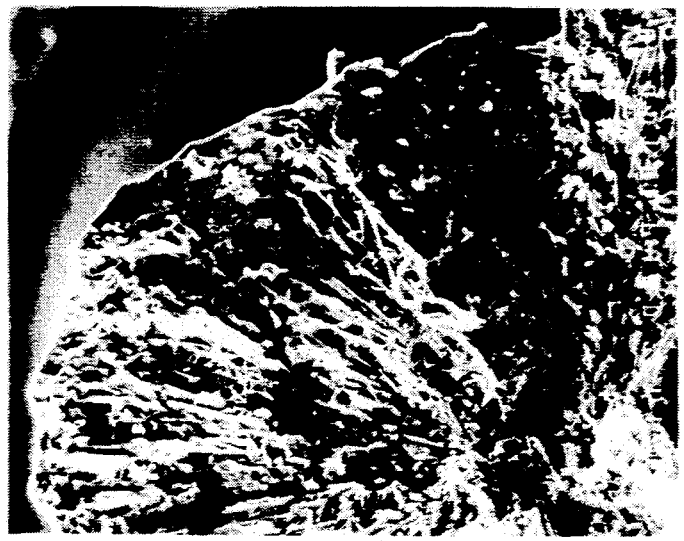
FIG. 2 is a scanning electron micrograph of the structure of a sodium percarbonate particle obtained in Comparative Example 1.

A stable sodium percarbonate particle of the present invention is at least the inside of the particle is penetrated and coated with a borate. In other words, a stable sodium percarbonate particle of the present invention is a sodium percarbonate composite comprising sodium percarbonate particle and a borate with which the walls of pores existing in a sodium percarbonate particle are covered and coated.

The borate according to the invention is preferably a sodium salt of boric acid, especially preferably sodium metaborate. A sequestering agent, such as ethylenediaminetetraacetate, nitrilotriacetate and a phosphate, and an inorganic salt such as a silicate and a sulfate may be contained in the sodium percarbonate composite together with the borate.

The amount of the borate is from 0.5 to 10% by weight, preferably from 2 to 8% by weight, based on the weight of sodium percarbonate.

The sodium percarbonate composite desirably has an average particle diameter of from 100 to 2000 $\mu$m, more desirably from 250 to 1500 $\mu$m.

The process of the present invention for preparing a stable sodium percarbonate particle comprises (a) subjecting a dried sodium percarbonate particle and an aqueous solution of a borate to solid-liquid mixing to form a mixture and (b) drying said mixture.

Namely the sodium percarbonate particle of the present invention is obtained by treating sodium percarbonate particle with a solution of a borate so that the borate may penetrate into the inside of the particle and drying the resultant so that the borate is left there covering the walls' surface of the pores in the particle.

A sodium percarbonate obtained by reacting sodium carbonate with hydrogen peroxide in the usual manner and dehydrating the reaction product by the usual method normally contains from 7 to 18% by weight of water, and is known as wet sodium percarbonate. A sodium percarbonate prepared by drying the wet sodium percarbonate to a reduced water content is termed dry sodium percarbonate. As the raw material for the manufacture of a penetrated and coated, a stable sodium percarbonate particle in accordance with the present invention, it is advantageous to use a sodium percarbonate particle dried to a water content of less than 8% by weight. The drying presumably deforms the minute voids or pores to have the shape and size easily penetratable by the aqueous solution of a borate. Sodium percarbonate containing less than 8% by weight of water can be commercially obtained and the example of them includes sodium percarbonate manufactured by Nihon Peroxide Co. Ltd. and sodium percarbonate manufactured by Mitsubichi Gas Chemical Co. Ltd.

The sodium percarbonate as the raw material desirably ranges in average particle diameter from 50 to 2000 $\mu$m.

The borate used as a penetrating and coating agent according to the process for preparing a stable sodium percarbonate particle of the invention is preferably a sodium salt of boric acid such as sodium tetraborate decahydrate (or borax) ($Na_2O \cdot 2B_2O_3 \cdot 10H_2O$ or $Na_2B_4O_7 \cdot 10H_2O$), sodium tetraborate pentahydrate ($Na_2O \cdot B_2O_3 \cdot 5H_2O$), sodium tetraborate tetrahydrate ($Na_2O \cdot B_2O_3 \cdot 4H_2O$), sodium tetraborate anhydrate ($Na_2O \cdot B_2O_3$), sodium octaborate tetrahydrate ($Na_2O \cdot 4B_2O_3 \cdot 4H_2O$), sodium pentaborate pentahydrate ($Na_2O \cdot 5B_2O_3 \cdot 10H_2O$), sodium metaborate tetrahydrate ($NaBO_2 \cdot 4H_2O$) and sodium metaborate dihydrate ($NaBO_2 \cdot 2H_2O$), especially preferably sodium metaborate dihydrate and sodium metaborate tetrahydrate. This agent may contain a sequestering agent, such as ethylenediaminetetraacetate, nitrilotriacetate and a phosphate, It may further contain an inorganic salt such as a silicate and a sulfate. The amount of these additives is preferably 50% and less by weight on the basis of the borate.

The amount of the borate required for penetration and coating of a sodium percarbonate particle is from 0.5 to 10% by weight, preferably from 2 to 8% by weight, based on the weight of sodium percarbonate.

The concentration of the borate in aqueous solution as the penetrating and coating agent ranges desirably from 1 to 55% by weight as anhydrous salt, more desirably from 5 to 50% by weight as anhydrous salt and especially desirably from 20 to 50% by weight as anhydrous salt.

In order to obtain a sodium percarbonate particle penetrated and coated inside and coated on the surface thereof with a borate, it is necessary to choose a proper solid-liquid mixing temperature depending on the properties of the sodium percarbonate particle used as a raw material and the type and concentration of the borate used.

The operation for solid-liquid mixing and then drying (single cycle) can give the objective stable sodium percarbonate particle of the invention. However, the conditions under which a single cycle of the operation produces the stable sodium percarbonate particle of the invention are critical within rather narrow limits. It is industrially advantageous to repeat the solid-liquid mixing and drying procedures at least twice, preferably two or three times. While the solid-liquid mixing and drying are conducted at the same time, the objective stable sodium percarbonate particle of the invention may not be obtained.

During the solid-liquid mixing, the dried sodium percarbonate particle is at a temperature of 50° C. or below, preferably of 35° C. or below. If the particle temperature is higher than 50° C., the penetrating and coating agent fails to penetrate satisfactorily upon contact with the particle, because the dissolution rate of the particle surface exceeds the penetration rate of the penetrating and coating agent, resulting in a reduced stability of the sodium percarbonate particle in the invention. At the same time, the penetrating and coating agent tends to act as a binder to thereby increase the average particle diameter of the coated particle above the size desired for the purposes of the invention, thus lowering the solubility of the product.

The sodium percarbonate particle penetrated and coated with a borate in conformity with the invention is by far the more stable than the conventional sodium percarbonate particle coated with a borate merely on the surface. Ordinarily, a sodium percarbonate particle with a relatively large particle diameter has been used for added stability, with consequent reduction in the solubility. According to the invention, by contrast, an increased stability is attained with a sodium percarbonate particle of a relatively small diameter. This offers an advantage from the solubility standpoint.

EXAMPLES

Example 1

400 g of sodium percarbonate (moisture content: 0.5% by weight; average particle diameter: 495 $\mu$m) (at a solid material temperature of 20° C.) was fed into an agitated mixer ("High-speed mixer FS-GS-15"; mfd. by Fukae Kogyo Co. Ltd.). While the feed was stirred at 300 rpm, 34.9 g of an aqueous solution (28.6% by weight as anhydrous salt) of sodium metaborate tetrahydrate (at a liquid temperature of 70° C.) was added thereto dropwise in 3 minutes and then mixed for one minute (with circulation of water at 20° C. through a jacket). Next, the mixture was transferred to a fluidized-bed ("STREA-1" type; mfd. by Powrex Co. Ltd.), where it was dried with hot air at 80° C. for 10 minutes and then cooled with air at 20° C. for 5 minutes. It was returned to the agitated mixer, and the above procedure was repeated. The amount of the aqueous solution containing 28.6% by weight of sodium metaborate tetrahydrate used was 21.0 g.

The same procedure of the Example 1 was proceeded except for using an aqueous solution (19% by weight as anhydrous salt) of borax ($Na_2B_4O_6 \cdot 10H_2O$) (at a liquid temperature of 70° C.) as the penetrating and coating agent, The amount of the consumed agent was 40.0 g in the first cycle and 24.0 g in the second.

Examples 3 to 5

The same procedure of the Example 1 was proceeded except that, in addition to the sodium metaborate, another inorganic salt and/or stabilizer was added to the penetrating and coating agent. The penetrating and coating agents employed, and the concentration and the amount of the aqueous solution are listed in Table 1.

The total amount of the sodium metaborate, another inorganic salt and stabilizer used was 4% by weight as anhydrous salt based on sodium percarbonate as raw material (at a liquid temperature of 70° C.). The whole amount of the above-described compounds added in the first run was 2.5% by weight and that in the second run was 1.5% by weight.

sodium percarbonate particle of Comparative Examples 1 and 2 was coated only on the surface of the particle.

Figure 1:
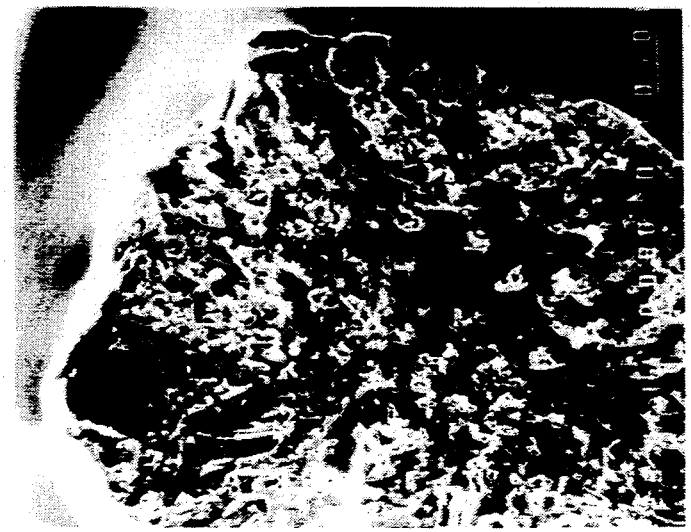
FIG. 1 is a scanning electron micrograph of the structure of a sodium percarbonate particle obtained in Example 1.

FIG. 1 is a scanning electron micrograph (magnification 110×) of the structure of a sodium percarbonate particle obtained in Example 1. The particle is penetrated inside and coated on the surface with a metaborate. FIG. 2 is a scanning electron micrograph (magnification 110×) of the structure of a sodium percarbonate particle obtained in Comparative Example 1. The borate coating is confined to only the particle surface.

The sodium percarbonate particles prepared in the Examples and Comparative Examples as above were tested for their storage stability by the following method. The results are given in Table 2.

Testing Method 1 g of each sodium percarbonate particles prepared in the Examples and Comparative Examples and 9 g of a phosphorus-free powdered detergent of the composition specified below were placed in a plastic container having a capacity of 50 cc. The container was closed with a lid (which had been pinholed), and the contents were allowed to stand at 40° C. and 80% RH (Relative Humidity) for 14 days. The available residual oxygen rate was calculated from the following equation:

available residual oxygen rate (%) =

$$\frac{\text{available oxygen after storage}}{\text{available oxygen before storage}} \times 100.$$

For the determination of available oxygen, the method of titration with 0.1N potassium permanganate

TABLE 1

| Example No. | Penetrating and coating agent (by weight as anhydrous salt) | | Amount of aqueous solution added (g) | | Concentration of the aqueous solution containing penetrating and coating agent (by weight as anhydrous salt) | |
|---|---|---|---|---|---|---|
| | | | first | second | | |
| 3 | sodium metaborate<br>+<br>magnesium sulfate | 3%<br><br>1% | 33.3 | 20.0 | sodium metaborate<br>+<br>magnesium sulfate | 22.5%<br><br>7.5% |
| 4 | sodium metaborate<br>+<br>sodium silicate #2 | 3%<br><br>1% | 33.3 | 20.0 | sodium metaborate<br>+<br>sodium silicate #2 | 22.5%<br><br>7.5% |
| 5 | sodium metaborate<br>+<br>EDTA.2Na | 3.4%<br><br>0.6% | 36.8 | 22.1 | sodium metaborate<br>+<br>EDTA.2Na | 23.1%<br><br>4.1% |

Comparative Example 1

The same procedure as described in the Example 1 was carried out except that the temperature of sodium percarbonate was 60° C. during mixing (while hot water at 70° C. was circulated through a jacket).

Comparative Example 2

The same procedure as described in the Example 1 was carried out except that sodium carbonate (a aqueous solution of 30% by weight as anhydrous salt) was used in place of sodium metaborate. The amount of the coating sodium carbonate was 4% by weight as anhydrous salt based on sodium percarbonate as raw material.

In the Examples 1 to 5, each sodium percarbonate particle obtained had been penetrated and coated both inside and on the outer surface of the particle. Each was used.

| Composition of the detergent | |
|---|---|
| polyoxyethylene (EO = 8.5) alkyl ($C_{12}$) ether | 17% by weight |
| sodium linear alkyl-(C = 13.9)benzenesulfonate | 3 |
| beef tallow soap | 2 |
| synthetic zeolite (type 4A) | 39 |
| sodium silicate #1 | 11 |
| sodium carbonate | 8 |
| polyethylene glycol (MW: 14000) | 2 |
| maleic acid-acrylic acid copolymer ( monomer ratio: 30/70  MW: 70,000 ) | 2 |
| protease | 1 |
| sodium sulfate | 10 |
| water | 5 |

The solubilities of the sodium percarbonate particles obtained in the above Examples and Comparative Examples were evaluated in the following manner.

Method of Evaluating Solubility

One liter of tap water was poured into a beaker (of 1-liter capacity), into which was thrown 1 g of each sodium percarbonate particles obtained in the above Examples and Comparative Examples, and the feed was stirred at a speed of 200 rpm. The period of time from the initiation of stirring till the point where the test solution no longer underwent a change in electric conductivity was measured and defined as the dissolution time.

Table 2 gives the results.

TABLE 2

| Sodium percarbonate particle | Penetrating and coating agent | Avail. resid. $O_2$ rate (%) | Dissolution rate (sec) | Average particle diameter (μm) |
| --- | --- | --- | --- | --- |
| Example 1 | sodium metaborate | 99.8 | 97 | 585 |
| Example 2 | borax | 98.0 | 98 | 597 |
| Example 3 | sodium metaborate + magnesium sulfate | 97.8 | 101 | 603 |
| Example 4 | sodium metaborate + sodium silicate #2 | 99.0 | 105 | 613 |
| Example 5 | sodium metaborate + EDTA.2Na | 98.5 | 99 | 600 |
| Comp. Ex. 1 | sodium metaborate | 83.0 | 157 | 812 |
| Comp. Ex. 2 | sodium carbonate | 46.0 | 132 | 798 |
| Untreated sodium percarbonate | | 31.1 | 60 | 495 |

Having thus described the invention, it will be obvious that the same may be varied In many ways, such variations are not to be regarded as a departure from the spirit and scope of the invention, and all such modifications as would be obvious to one skilled In the art are Intended to be Included with in the scope of the following claims.

We claim:

1. A stable sodium percarbonate particle comprising a sodium percarbonate particle having pores and 2–8% by weight of a borate based on sodium percarbonate; wherein the inside of said particle is penetrated and the surfaces of said pores in said particle are coated with said borate, and the outer surface of said particle is also coated with said borate.

2. The stable sodium percarbonate particle according to claim 1, wherein the borate is a sodium borate.

3. The stable sodium percarbonate particle according to claim 1, wherein the borate is sodium metaborate.

4. The stable sodium percarbonate particle according to claim 1, which has an average particle diameter of from 100 μm to 2000 μm.

5. The stable sodium percarbonate particle according to claim 4, which has an average particle diameter of from 250 μm to 1500 μm.

6. A process for preparing a stable sodium percarbonate particle having pores such that the said particle is penetrated and the surfaces of said pores in said particle are coated with a borate, and the outer surface of said particle is also coated with said borate, the borate comprising 2–8% by weight based on sodium percarbonate of said particle; said process comprising (a) mixing a dried sodium percarbonate particle having pores with an aqueous solution comprising 1 to 55% by weight of a borate, based as an anhydrous salt, wherein the temperature of said dried sodium percarbonate particle is maintained at 35° C. or less during mixing, (b) drying said mixture to obtain a partially stabilized sodium percarbonate particle, and (c) repeating steps (a) and (b) to obtain the final stabilized sodium percarbonate particle.

7. The process according to claim 6, wherein the dried sodium percarbonate particle contains less than 8% by weight of water.

8. The process according to claim 6, wherein an average particle diameter of the dried sodium percarbonate particle is from 50 μm to 2000 μm.

9. The process according to claim 6, wherein the aqueous solution of a borate further comprises at least one component selected from the group consisting of a sequestering agent and an inorganic salt other than borate.

* * * * *